US010471437B2

(12) United States Patent
Nicholas

(10) Patent No.: US 10,471,437 B2
(45) Date of Patent: Nov. 12, 2019

(54) PROCESS FOR THE MANUFACTURE OF TRINIDAD LAKE ASPHALT COLD MILLED

(71) Applicant: Lake Asphalt of Trinidad and Tobago (1978) Ltd., La Brea (TT)

(72) Inventor: Dolly Nicholas, Marabella (TT)

(73) Assignee: LAKE ASPHALT OF TRINIDAD AND TOBAGO (1978) LTD., La Brea (TT)

( * ) Notice: Subject to any disclaimer, the term of this patent is extended or adjusted under 35 U.S.C. 154(b) by 344 days.

(21) Appl. No.: 15/404,678

(22) Filed: Jan. 12, 2017

(65) Prior Publication Data

US 2018/0194683 A1 Jul. 12, 2018

(51) Int. Cl.

*C04B 26/26* (2006.01)
*B02C 23/38* (2006.01)
*B02C 23/10* (2006.01)
*B02C 23/00* (2006.01)
*B02C 23/08* (2006.01)
*B02C 23/14* (2006.01)

(52) U.S. Cl.

CPC ............. *B02C 23/38* (2013.01); *B02C 23/00* (2013.01); *B02C 23/08* (2013.01); *B02C 23/10* (2013.01); *B02C 23/14* (2013.01)

(58) Field of Classification Search

CPC ......... B02C 23/38; B02C 23/00; B02C 23/08; B02C 23/14; B02C 23/10; C08L 95/00; C10C 3/14

USPC .............................................. 241/29, 23, 65

See application file for complete search history.

(56) References Cited

U.S. PATENT DOCUMENTS

| | | | | |
|---|---|---|---|---|
| 4,089,698 A * | 5/1978 | Corbett | ..................... | C10C 3/14 106/278 |
| 4,420,443 A * | 12/1983 | Kaji | .......................... | C10C 3/14 264/141 |
| 4,624,807 A * | 11/1986 | Miyauchi | .................. | C10C 3/14 201/42 |
| 2019/0016894 A1* | 1/2019 | Anaclet | .................... | C08K 3/36 |

* cited by examiner

*Primary Examiner* — Omar Flores Sanchez
(74) *Attorney, Agent, or Firm* — Nixon & Vanderhye PC

(57) ABSTRACT

A method for producing a non-coalescing asphalt from raw natural asphalt herein referred to as TLA Cold Milled. Raw TLA is crushed into smaller particles and milled at ambient temperature. The milled TLA is passed through a first sieve to maintain the separation of the particles and to produce a damp milled TLA in a powdered state. The damp milled powdered TLA is dried by exposing it to heat and is thereafter cooled to ambient temperature. The dried and cooled powdered TLA is passed through the first sieve or another sieve to produce the TLA Cold Milled which may be packaged at ambient temperature in conventional bags. The milling of the asphalt results in each particle of inorganic matter within the asphalt being surrounded by bitumen and a thin film of inorganic material, producing asphalt in a non-coalescing form, i.e., the TLA Cold Milled.

16 Claims, 2 Drawing Sheets

FIGURE 1: FLOW DIAGRAM OF THE MANUFACTURE OF TLA COLD MILLED
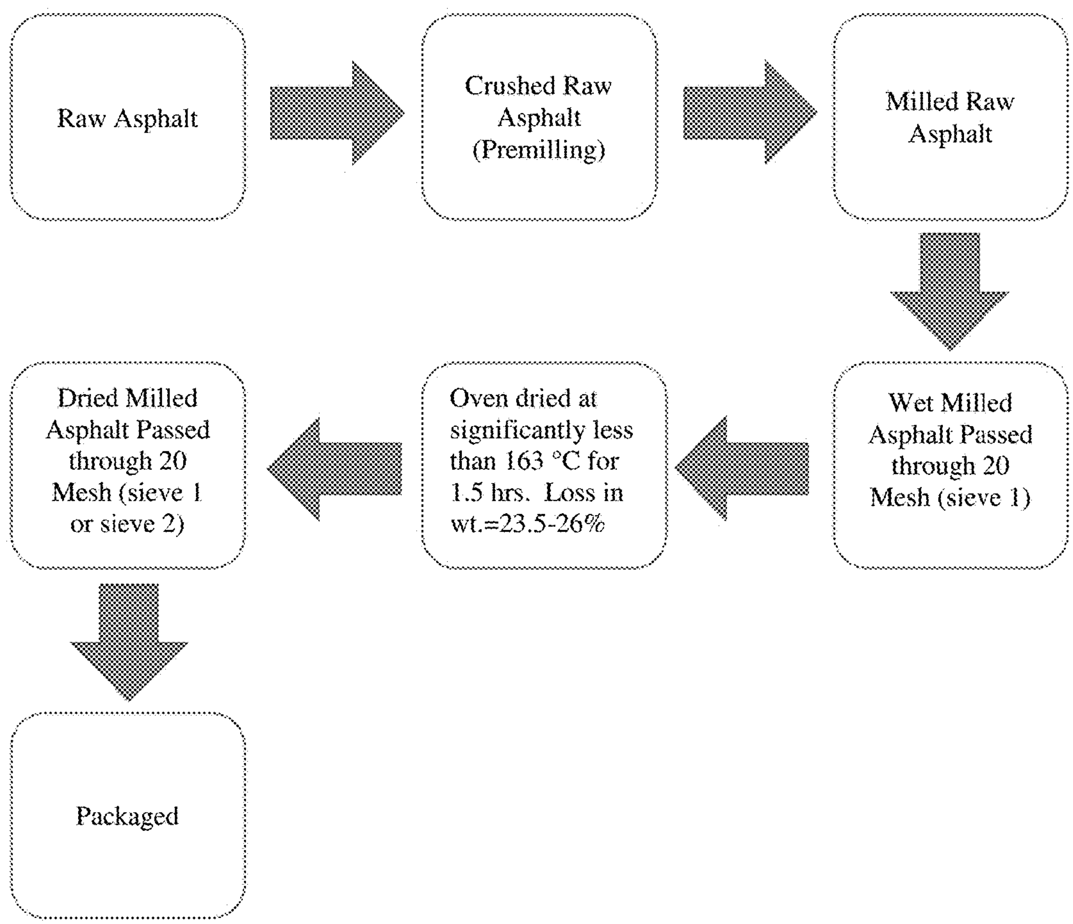
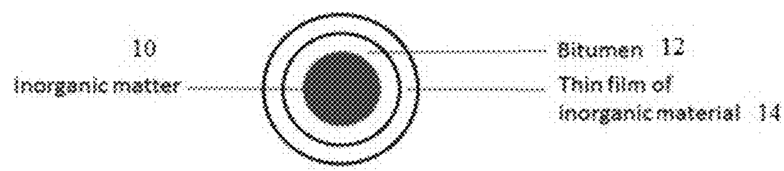
Figure 2: Diagram showing the inorganic matter of the TLA Cold Milled surrounded by bitumen and a thin film of inorganic material Figure 3: TLA as dug from the earth
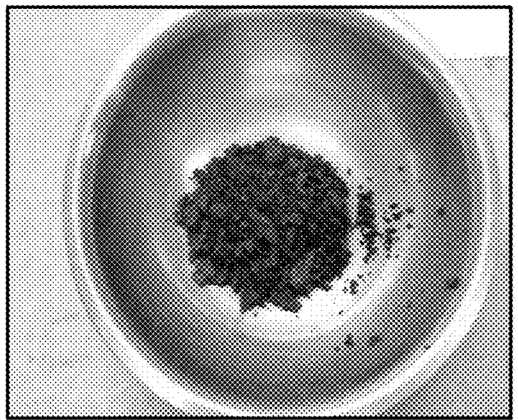
Figure 4: Crushed (Pre-Milled) Raw Asphalt
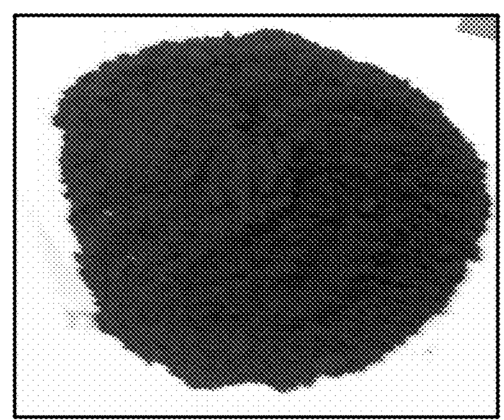
Figure 5: Damp Powder after Milling & Sieving
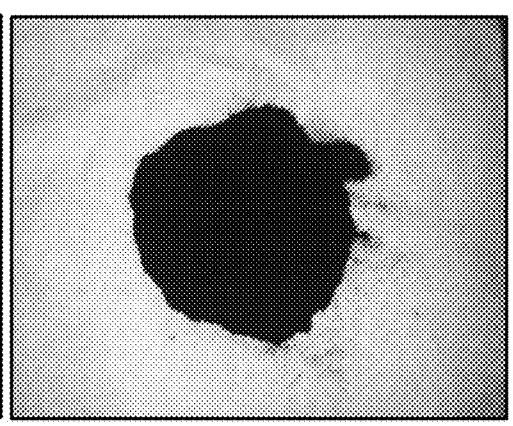
Figure 6: TLA Cold-Milled

PROCESS FOR THE MANUFACTURE OF TRINIDAD LAKE ASPHALT COLD MILLED

BACKGROUND OF THE INVENTION

1. Field of the Invention

This invention relates to a process for producing a product from raw natural asphalt hereinafter called Trinidad Lake Asphalt (TLA) Cold Milled. The raw natural asphalt is milled at ambient temperature. The milling process produces a powdered product of variable particle size distribution, in which each particle of naturally occurring inorganic matter is coated with naturally occurring bitumen. During the milling process another naturally occurring inorganic material which is present in the raw asphalt is also released. This material coats the outside of the bitumen-coated, inorganic matter particulate and renders it non-coalescing (FIG. 5).

The raw asphalt is processed as is and there are no additives, meaning that it is 100% TLA.

2. Description of the Background Art

The problems associated with the use of refined Trinidad Lake Asphalt as presently sold in drums are well documented in U.S. Pat. Nos. 6,558,462 and 8,852,332.

At present, refined TLA is manufactured from raw natural asphalt which exists in a lake in La Brea Trinidad. The raw asphalt is dug from the earth and often contains cellulose fibres from plant based material. This extracted asphalt is filled into buckets which travel uphill by electromechanical means and the raw asphalt is manually tipped over into open-topped stills.

Water (which makes up about 30% of the raw asphalt), is then removed from the raw asphalt through the use of steam at 163° C.—the stills are fitted with heating coils. This process takes about 16 hours. After water removal, the hot molten asphalt is agitated, again with steam for a further 2 hours to ensure homogeneity. This agitation is achieved through the use of perforated pipes which allow the passage of steam, with which the still is also equipped. Agitation is then stopped and the hot molten asphalt is further heated for an additional hour to remove any residual water. The entire process takes 18 hours as there is overlap in the times used to melt, agitate and remove the water added during the agitation process.

This product is packaged hot at 163° C. in silicone treated drums. The material within the drums contract on cooling and the drums are then further topped up so as to ensure that each drum has the required weight—a process referred to as double handling. The product which is derived from this process is termed refined TLA or drummed TLA. This drummed TLA is sold as a hot mix modifier.

This process is long—a manufacturing time of 18 hours is required, is very labor intensive and is energy intensive due to the high heat needed. In addition the drummed TLA must be reheated before being used as a hot mix modifier.

This invention deals with a new way of producing refined Trinidad Lake Asphalt (TLA), without the use of high temperature (much less than 163° C.), in a much shorter period of time (<18 hours), in a powdered form of specific variable size distribution that is non-coalescing and that is 100% TLA. In addition the TLA Cold Milled does not need to be heated before use and no double handling is required. Thus this new way of producing refined Trinidad Lake Asphalt addresses the problems documented above.

This invention thus solves the manufacturing problems associated with the traditional method for refining TLA described above through the use of a process that is performed at ambient temperature. Heat is only applied to remove the moisture with a maximum temperature of much less than 163° C. being used. The resulting TLA Cold Milled, also a hot mix asphalt modifier, gives a better PG for the same modifier content versus the traditional drummed TLA.

The maximum time required to produce the 100% TLA Cold Milled is 2-2.5 hours.

With this invention each inorganic particle present in the raw natural asphalt is surrounded by the bitumen which naturally occurs within the asphalt (FIG. 5). This enables the TLA Cold Milled to be easily mixed into hot refinery bitumen which is to be modified (a hot mix)—the naturally occurring bitumen which surrounds the inorganic matter of the Cold Milled TLA is readily solubilised by the refinery bitumen in the hot mix.

The TLA Cold Milled does not have to be made molten in order for mixing to occur.

Various blends of Performance Grade (PG) hot mix asphalts are possible.

BRIEF SUMMARY OF THE INVENTION

The natural asphalt is dug from the earth (FIG. 3) and crushed (pre-milled) (FIG. 4). It is then milled for 1-10 mins at room temperature and the resulting product passed through a 20-50 mesh sieve (e.g., 20 mesh) (FIG. 5). This sieving is necessary to keep the meshed particles separate. The sieved, damp, Cold Milled TLA is in a powdered state and is placed in an oven at much less than 163° C. (e.g., 105° C.-120° C.) for 1.0-1.5 hours. The product is then cooled to ambient temperature, re-sieved (20-50 mesh, e.g., 20 mesh) (FIG. 6) and packaged to be sold. It is packaged at ambient temperature. The first sieving is necessary to keep the particles 'separated'.

The aim of the process is to enable each inorganic particulate which is present in raw TLA to be surrounded by the bitumen which is also present in the raw TLA. The process allows for no free inorganic material to exist within the powder, each inorganic particle 10 being surrounded by bitumen 12 (FIG. 2). Examples of inorganic materials are amorphous (unstructured, e.g., clays, silica) and crystalline (structured, e.g., quartz).

During the process for producing TLA Cold Milled, an inherent inorganic material which is present in the natural TLA is released. This inorganic material coats the bitumen which surrounds each inorganic particle. On drying, this inherent inorganic material leaves an inorganic film 14 on each interface of each bituminous particle (FIG. 2), which prevents coalescing of the Cold Milled powdered material. Even with this inorganic film the refined TLA Cold Milled mixes readily into the hot refinery bitumen at a temperature of 88° C.-92° C. and a percentage by weight in accordance with ASTMD 6626. The major constituents of the naturally occurring inorganic materials are sodium, potassium, magnesium, calcium, chloride, sulphate and carbonate.

During this process of producing the TLA Cold Milled, the larger cellulose fibres are retained on the sieves, with the smaller ones passing through the sieves and remaining in the asphalt. However when a hot mix is being prepared, the 'free' fibre particles (fibres not coated with bitumen) which have passed through the sieve, become coated with the modified hot mix and therefore have no effect on the integrity of the finished pavement.

BRIEF DESCRIPTION OF THE DRAWINGS

FIG. 1 is a block diagram of the process of the present invention for the manufacture of refined TLA Cold Milled;

FIG. 2 is a diagrammatic illustration showing the inorganic matter of the TLA Cold Milled surrounded by bitumen and a thin film of inorganic material;

FIG. 3 is a photograph of TLA as dug from the earth;

FIG. 4 is a photograph of crushed or pre-milled raw TLA;

FIG. 5 is a photograph of damp TLA powder after milling and sieving; and

FIG. 6 is a photograph of the TLA Cold-Milled produced in accordance with the present invention.

DETAILED DESCRIPTION OF THE INVENTION

As shown in the flow diagram of FIG. 1, into a mill is placed raw asphalt dug from the earth which has been crushed (pre-milled) to break up the chunks of raw asphalt into smaller pieces. The crushed sample is milled and passed through a 20-50 mesh sieve (e.g., 20 mesh). The sieved material is then placed in an oven at a temperature much less than 163° C. (105° C.-120° C. for 1.0-1.5 hours) to remove moisture, thus producing refined dry TLA Cold Milled.

The % of unrefined asphalt material retained on the 20-50 mesh screen is <2% (1.22%-1.78%). The process produces little to no waste.

The sample must be milled to a fine particle size to allow for:

i) Maximum surface area of the bitumen surrounding the inorganic material.

ii) Ease of release of moisture during the drying process.

iii) Maximum surface area to allow for the inorganic released agent to coat the bitumen, so as to prevent coalescing, thus enabling the deposited film to be as thin as possible.

The weight used in the mill depends on the capacity of the mill—weights can vary from 227 g (½ lb) to 454 g (1 lb). The final milling time depends on the sizes of the pre-milled raw asphalt—the smaller the asphalt pieces, the less time required to produce the final product. The pre-milled material has different shapes e.g. rectangular, triangular etc. and is <0.5 in$^2$ in particle size. After crushing (pre-milling), the asphalt is milled for 1-10 mins (depending on the weight and particle sizes of the raw asphalt used) to a particle size of 841 mμ-297 mμ before drying and sieving. The drying process takes a further 1.0-1.5 hours.

The process can be batch or continuous.

Results

Physical Test Results:

The refined TLA Cold Milled was independently tested and the results are as stated below:

| Test | Refined TLA Cold Milled | Refined Drummed TLA |
|---|---|---|
| Softening Point, D 36 | 151.5° C. | 89-99° C. |
| Ash, ASTM D2415 | 36.79% | 35-37.5% |
| Solubility in TCE, ASTM D2172 | 52.56% | 53-55% |
| Loss on Heating, ASTM D6 | 0.057% | 1.58% |
| Water Content, ASTM D95 | 0.5% | 0.3% |
| Asphaltenes, ASTM D4424 | 31% | 33% |
| Maltenes | 69% | 67% |
| Flash & Fire Point, ASTM D92 | 287° C. | 255-260° C. |
| Penetration (100 g, 5 sec) | 1 | 0-5 |
| Bulk Loose Density g/cc | 0.64 | Not applicable |

Performance Grade Results:

A comparison of the Performance Grade of the refined TLA Cold Milled and drummed TLA was independently tested and the results are as stated below:

25% by weight each of drummed TLA and TLA Cold Milled was added to refinery bitumen with a PG rating of 52-22.

PG 52-22+25% TLA (drummed), produced a modified bitumen with PG 58-10.

PG 52-22+25% TLA (Cold Milled), produced a modified bitumen with PG 64-16.

PAH Tests:

A comparison of the Poly-Aromatic Hydrocarbon (PAH) content of a modified refinery bitumen using TLA Cold Milled and Drummed TLA, was independently tested and the results are as stated below:

| | | | RESULTS-PQL* is 17.8 for NFT, 20.2 for Ref Bit and 21.5 for DT | | | | | |
|---|---|---|---|---|---|---|---|---|
| | | TEST | TLA Cold Milled | | Refinery Bitumen | | TLA Refined (Drummed) | |
| | PROPERTY | METHOD | Results | MDL | Results | MDL | Results | MDL |
| PAH, ppm | 1-Methylnaphthalene | EPA 8270 | BDL*** | 6.3 | BDL | 7.2 | BDL | 7.6 |
| | 2-Methylnaphthalene | | BDL | 7.2 | BDL | 8.2 | BDL | 8.7 |
| | Acenaphthene | | BDL | 6.5 | BDL | 7.4 | BDL | 7.9 |
| | Acenaphthylene | | BDL | 5.6 | BDL | 6.3 | BDL | 6.7 |
| | Anthracene | | BDL | 5.5 | BDL | 6.2 | BDL | 6.6 |
| | Benzo(a)anthracene | | BDL | 5.2 | BDL | 5.9 | BDL | 6.2 |
| | Benzo(a)pyrene | | BDL | 2.1 | BDL | 2.4 | BDL | 2.5 |
| | Benzo(b)fluoranthene | | BDL | 13.5 | BDL | 15.2 | BDL | 16.2 |
| | Benzo(g,h,i)perylene | | BDL | 6.4 | BDL | 7.3 | BDL | 7.8 |
| | Benzo(k)fluoranthene | | BDL | 3.9 | BDL | 4.4 | BDL | 4.7 |
| | Chrysene | | BDL | 6.4 | BDL | 7.2 | BDL | 7.7 |
| | Dibenz(a,h)anthracen | | BDL | 9.0 | BDL | 10.2 | BDL | 10.9 |
| | Fluoranthene | | BDL | 5.8 | BDL | 6.6 | BDL | 7.0 |

-continued

| PROPERTY | TEST METHOD | TLA Cold Milled Results | TLA Cold Milled MDL | Refinery Bitumen Results | Refinery Bitumen MDL | TLA Refined (Drummed) Results | TLA Refined (Drummed) MDL |
|---|---|---|---|---|---|---|---|
| | | RESULTS-PQL* is 17.8 for NFT, 20.2 for Ref Bit and 21.5 for DT | | | | | |
| Fluorene | | BDL | 8.1 | BDL | 9.1 | BDL | 9.7 |
| Indeno(1,2,3- | | BDL | 9.0 | BDL | 10.2 | BDL | 10.9 |
| Naphthalene | | BDL | 5.8 | BDL | 6.6 | BDL | 7.0 |
| Phenanthrene | | 7.8 | 6.8 | 9.6 | 7.7 | BDL | 8.2 |
| Pyrene | | BDL | 9.0 | BDL | 10.2 | BDL | 10.9 |

PQL—practical quantitation limit;
MDL—minimum detection limit;
BDL—Below minimum detection limit;
NFT—TLA Cold Milled;
Ref Bit—Refinery Bitumen;
DT—TLA Refined (Drummed);
TLA Cold Milled—PG 52-22 + 25% TLA (Cold Milled);
Refinery Bitumen—refinery bitumen PG 52-22;
TLA Refined (Drummed)—PG 52-22 + 25% TLA (drummed)

In every instance, the polyaromatic hydrocarbon in question was lower with the TLA Cold Milled compared to TLA (drummed).

Coalescing Results:

It is imperative that the TLA Cold Milled does not coalesce during transportation to avoid the need for the complicated handling procedures (such as double handling) that are presently required for drummed TLA.

To this end coalescing tests were conducted under worst case conditions. Taking into consideration the size of the bags to be used for transportation, the bulk density of the material, the number of bags which would fill a container, the temperature in a container, etc., stacking tests were conducted using a minimum of 837.67 kg/m$^2$, a temperature of 60-70° C. and a time frame of at least 35 days.

No coalescing of the TLA Cold Milled was observed after repeated stacking tests were conducted.

Characteristics and Advantages of Present Invention:

1) A process for producing TLA which is milled at ambient temperature.
2) TLA Cold Milled is a hot mix asphalt modifier
3) TLA Cold Milled is 100% TLA.
4) TLA Cold Milled is manufactured with no external additive(s).
5) TLA Cold Milled is packaged in bags at ambient temperature—no silicone coated drums are needed.
6) TLA Cold Milled requires a manufacturing temperature of much less than 163° C. for production.
7) The process is simpler and safer than the manufacture of drummed TLA—no saturated steam is needed.
8) The process requires less energy than the manufacture of drummed TLA.
9) A process which requires less manufacturing time <18 hours, than drummed TLA.
10) After the removal of moisture, the process is 98% efficient.
11) TLA Cold Milled is easier to mix with hot bitumen than drummed TLA—mixing temperatures of 88-92° C. can be used.
12) A milling process which allows for the release of an inorganic material present in the natural asphalt.
13) The inorganic material on milling, sieving and drying in an oven at a temperature much less than 163° C., coats each powder grain.
14) The inorganic material prevents coalescing of the TLA Cold Milled.
15) The inorganic material does not prevent the TLA Cold Milled from being easily solubilised by the refinery bitumen.
16) The Cold Milled TLA mixes with the hot refinery bitumen at a much lower temperature 88-92° C. than drummed TLA which requires a temperature of 163° C.
17) Higher PG modified hot mix asphalts are possible with TLA Cold Milled for the same concentration levels versus traditional drummed TLA.
18) Lower PAH levels result when TLA Cold Milled is used as the modifier for the same bitumen at the same concentration levels in a hot mix when compared to traditional drummed TLA.
19) The manufacturing process can be used with other naturally occurring asphalts/bitumens.

The invention claimed is:

1. A method for the manufacture of Trinidad Lake Asphalt (TLA) Cold Milled, comprising:
obtaining raw TLA from the earth;
crushing the raw TLA into smaller particles;
milling the crushed raw TLA at ambient temperatures;
passing the milled TLA through a first sieve to produce a damp milled TLA in a powdered state;
drying the damp milled powdered TLA by exposing it to heat;
cooling the dried powdered TLA to ambient temperature;
passing the dried and cooled powdered TLA through the first sieve again or a second sieve to produce the TLA Cold Milled.

2. The method of claim 1 wherein the crushed and milled raw TLA particles are an average size of 841 mμ to 297 mμ.

3. The method of claim 1 wherein the crushed raw TLA is milled for 1-10 minutes at ambient temperature.

4. The method of claim 1 wherein the milled TLA is passed through a 20-50 mesh sieve.

5. The method of claim 4 wherein the sieve is 20 mesh.

6. The method of claim 1 wherein the damp milled powdered TLA is dried in an oven at 105° C. to 120° C. for 1-1.5 hours.

7. The method of claim 6 wherein the temperature is 110° C. and the time is 1.5 hours.

8. The method of claim 1 wherein the dried powdered TLA is passed through a 20-50 mesh sieve.

9. The method of claim 8 wherein the sieve is 20 mesh.

10. The method of claim 1 wherein the TLA Cold Milled is packaged at ambient temperature.

11. The method of claim 10 wherein the TLA Cold Milled is packaged in conventional bags.

12. The method of claim 1 wherein the TLA Cold Milled is used as a hot mix asphalt modifier and is mixed with hot mix Asphalt at a temperature of 88° C.-92° C.

13. The method of claim 12 wherein the percentage by weight of TLA Cold Milled is in accordance with ASTMD 6626.

14. The method of claim 12 wherein naturally occurring bitumen which surrounds inorganic matter of the TLA Cold Milled is solubilised by refinery bitumen in the hot mix.

15. The method of claim 1 wherein the milling produces a powdered product in which particles of a naturally occurring inorganic matter are coated with naturally occurring bitumen and a naturally occurring inorganic material present in raw asphalt is released which coats the outside of the bitumen-coated inorganic matter to render it non-coalescing.

16. The method of claim 1 wherein the milling of the crushed raw TLA serves to keep the meshed particles separate.

* * * * *